UNITED STATES PATENT OFFICE.

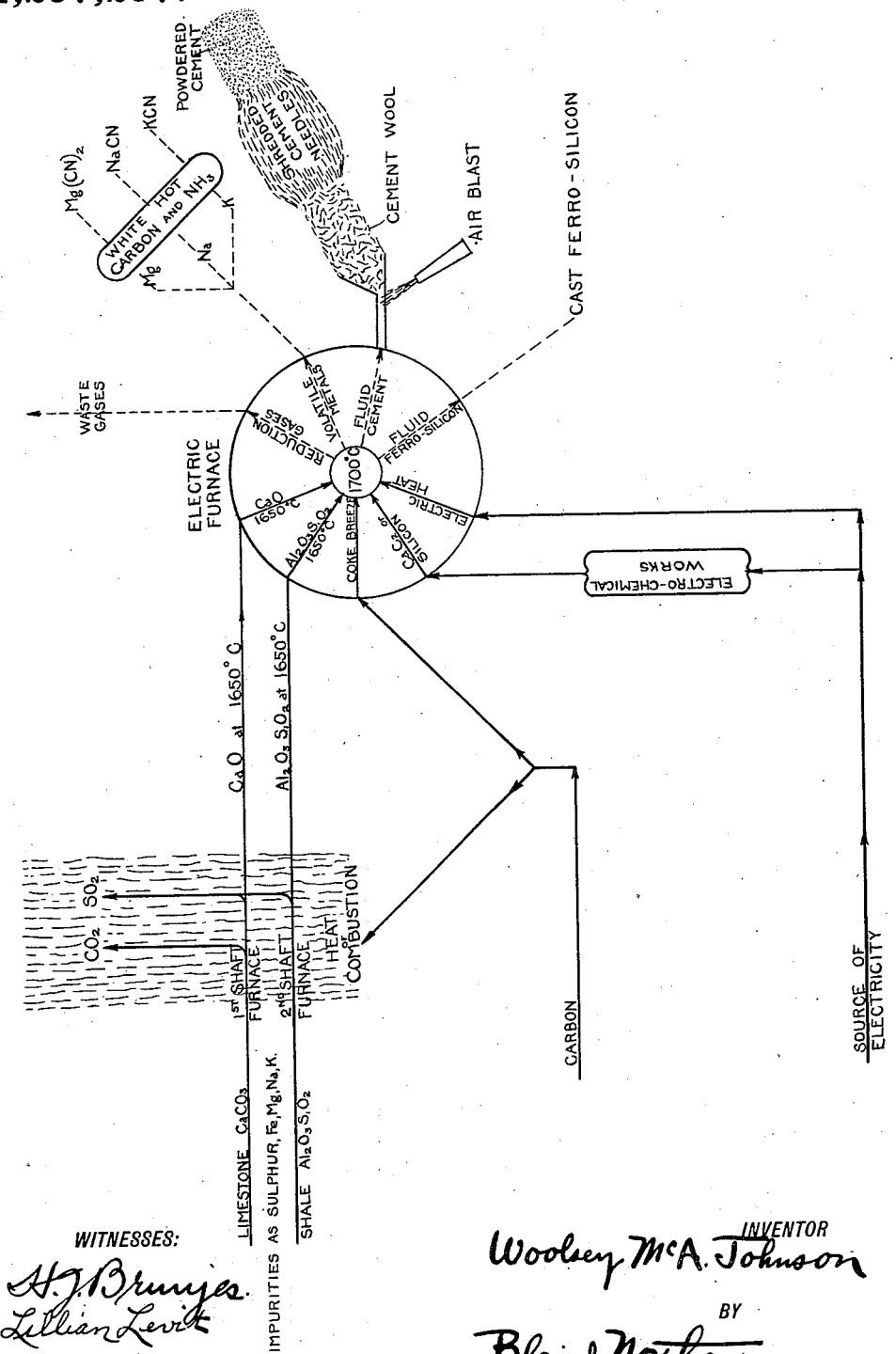

WOOLSEY McA. JOHNSON, OF HARTFORD, CONNECTICUT.

CEMENT-MAKING PROCESS.

1,297,297.   Specification of Letters Patent.   Patented Mar. 11, 1919.

Application filed February 2, 1915. Serial No. 5,787.

*To all whom it may concern:*

Be it known that I, WOOLSEY McA. JOHNSON, a citizen of the United States, and residing at Hartford, in the county of Hartford and State of Connecticut, have invented a new and Improved Cement-Making Process, of which the following specification is a full disclosure.

This invention relates to a cement-making process and it proposes certain steps combined and related as shown by the accompanying diagrammatic drawing.

The raw materials used in making cement may include a suitable source of calcium, such as any variety of limestone, and in fact, this raw material may be more or less impure. On the other hand, an impure aluminum silicate in the form of so-called shale or the like will also be used. Either or both of these raw materials may carry such impurities as oxids, or sulfites of magnesium, sodium, calcium, iron, etc., without deteriorating the quality of the ultimately produced cement. In calculating the percentage of lime used, it will be advisable to make allowances for the fact that no calcium ferrite will be formed but the iron will combine with silicon to form ferro-silicon, and to take account of the fact that all sulfur in consequential amounts will be eliminated by the oxidizing flame of the preliminary treatment. These impure raw materials are caused separately to pass through separate shaft furnaces, such for example as are used in burning lime, and by means of the direct application of an oxidizing flame produced by the direct combustion of fuel, these materials are brought to very high temperatures, say 1650° C. with the result that certain ingredients, such as $CO_2$, $SO_2$, etc., in the nature of impurities, are driven off as gases. By conducting this operation in two separate shaft furnaces, any incipient slagging is avoided even if very high temperatures be used, and therefore no hindrance to the descent of the rock occurs and the operation accordingly will progress in a clean-cut manner. Furthermore, since these materials are substantially infusible so long as they are not permitted chemically to combine, the temperatures may be run up to any point within that commercially attainable by means of the direct combustion of fuel.

The next step is to bring these highly heated raw materials together under such physical and temperature conditions as will enable them to continue to react as fast as they come together. This is accomplished by feeding them while white-hot into the inclosed retort of an electric furnace and in utilizing electrical heat to raise the temperature to the reacting point, say 1700° C. The amount of electrical energy needed for this operation, which produces a slag, is relatively small because the reactions taking place between the various substances in the furnace will evolve some heat and, furthermore, the raw materials are introduced into the electric furnace while at a temperature almost as high as the reaction temperature. The electric furnace is preferably lined with carbon brick and strongly reducing conditions are maintained in the smelting zone so that this carbon is not oxidized. In general, the furnace is so constructed as to withstand a high temperature and to afford a good insulation against heat radiation so as to render unnecessary the use of water cooling devices. These carbon slabs are backed with magnesia fused in place, and this in turn is backed by fire brick and kieselguhr. Preferably, the furnace is run at a high voltage of from 125 to 220 volts by causing the current to traverse a considerable distance, say twenty to thirty inches, through the slag and charge, thereby enabling small electrodes with a moderate amperage to be used for furnaces of considerable capacity.

The main smelting and reducing zone of the furnace consists of a deep bath of slag which is so composed in this instance as to constitute a fused high grade hydraulic cement. Into this bath passes the white-hot raw materials from the shaft furnaces, as has been described, and forthwith the CaO combines with the $Al_2O_3.SiO_2$ to form further additions of the slag. This chemical action generates and gives off a considerable amount of heat and, at the blue-white heat of the slag, the impurities are given off and the iron is converted into ferro-silicon. These side reactions are accomplished as follows:—

Several by-products are made which are valuable *per se* and which, by being eliminated from the cement, enable a pure cement to be produced. To this end, certain additional ingredients are introduced into the electric furnace. Thus, when consequential quantities of magnesium, sodium or potassium exist in the raw materials, some coke breeze or other cheap form of carbon is introduced into the electric furnace and, at the blue-white heat thereof, these volatile metals will be reduced and thrown off, together with various gases of reduction, and they may be caught as a metallic powder in a dust collector out of the furnace, or may be turned into a valuble by-product directly by passing through carbon together with ammonia gas to form cyanid products, such as $Mg(CN)_2$, KCN or $NaCN_1$.

Any iron compound, present as an impurity in the raw materials, is converted into ferro-silicon, thereby producing a valuable by-product and at the same time freeing the slag from the iron oxid which is so deleterious to cement.

When secondary or excess energy is available along with primary energy, I charge a lime having a high percentage of $Fe_2O_3$ or even add low grade iron ore to limestone, so that a much higher proportion of ferro-silicon is made in months when this excess energy is at hand. Accordingly, this excess energy is commercially used at a high efficiency. This can also happen with daily excess-power.

Instead of electrical heat, I can use under special commercial conditions the potential energy of calcium carbid or ferro-silicon high in silicon. The silicon or $CaC_2$ reacts on any $Fe_2O_3$ present and evolves large amounts of heat per unit of weight and can be added in such amounts as are needed. These reduce iron oxid and evolve enough energy to keep the furnace so much above its chemical critical temperature that the number of tons smelted per square foot is high. I am thus adding, instead of electrical heat, chemical heat. In such a way, chemical energy is stored or transported in an efficient commercial manner and secondary power can be economically used.

Moreover, the chief by-product, i. e., ferro-silicon, is made under much more favorable metallurgical conditions than those under which usual "50%" ferro-silicon is made in the electric furnace, because a certain amount of slag for various definite reasons must be made in the ferro-silicon electric furnace and it is hard to balance "reductivity" of smelting zone so that the product is made uniformly. For instance, if unreduced iron ore gets into the smelting zone at all irregularly, it will be reduced at once by silicon forming $SiO_2$, thereby making a temporarily low silicon product. But in my big "slag-bath" with only 5% or 10% of silica present to be reduced, the reduction is easy since it is a rigid principle of metallurgy that the first part of work is easy; last part of work is hard. The iron oxid, of course, under such highly reductive conditions is reduced to metal instantaneously and quantitatively complete.

The reaction resulting in the formation of ferro-silicon continuously evolves gas bubbles which, by uprising through the slag bath, maintain it in a state of uniformity by reason of its highly liquid condition and advantage is taken of its fluid form to effect a high subdivision of its particles without resorting to expensive crushing and grinding operations. That is to say, a jet of air under high pressure is projected against the stream of continuously escaping slag so as to blow or shatter it into "wool" and effect a minute subdivision when there is but little cohesive energy to be overcome by reason of the fact that the liquid particles are very mobile and possess no pronounced cohesion. This step has a further advantage that, as a result of the sudden chilling of the particles of cement, the chemical potential of the product against water is rendered greater than it is in the case of old-fashioned cement which is cooled slowly. This is analogous to the chemical operation of rendering slags readily soluble in acids by abruptly chilling the same, and in the case of my cement, the energy of solidification can be regarded as stored up in the powder to become available later as energy of hydration.

Preferably, compressed air, rather than steam, is used for "wooling" the slag because of a tendency of the steam to react to some extent with the cement when the lime content thereof exceeds twenty per cent., with a tendency to set a portion of the cement prematurely. The air is highly preheated by this operation and, to conserve this heat, this air is carried to both of the shaft furnaces and is utilized for raising the flame temperature thereof.

The wool, formed as above described, is now preferably ground and torn into needles, ranging from .001 inch to .1 inch in diameter and from .125 inch to .5 inch long, by passing it through a set of rolls having interlocking and knifelike projections made of manganese steel, somewhat similar to those of a "shoddy" machine. This torn wool is then fed into a dust-proof ball mill, such as of the Hardinge type, and by a continuous operation is ground to 150 mesh or finer. The result is an exceedingly pure hydraulic cement, since all of the impurities have been eliminated; the sulfur as $SO_2$ in the shaft furnaces, and the iron as ferro-silicon in the electric furnace; and this cement will be very homogeneous as a result of the facility with which the particles can mix while in the state of fusion in the electric furnace. The setting power of this cement will, in many instances, so greatly exceed that of ordinary cement that it is advisable to add a larger percentage of $CaSO_4H_2O$ so as to increase the percentage of Ca ions in water to such a point that the reaction velocity will be diminished. A cement thus made is stronger and more pulverulent and therefore less of it need be used in making a concrete mixture, and more water can be used so that a concrete capable of being poured and even "cast" in complicated molds can be employed. This cement is pure white, and a beautiful product can be made cheaply in connection with the profitable production of by-products.

Having thus revealed this invention, I claim as new and desire to secure the following combinations of steps, or equivalents thereof, by Letters Patent of the United States:—

1. A cement-making process of the nature disclosed, comprising highly heating lime and aluminum silicate separately; bringing together said constituents while in a state of incandescence, whereby they may chemically combine to form a fused slag; and then transforming said slag into a pulverulent cementitious material.

2. A cement-making process of the nature disclosed, consisting in bringing difficultly fusible constituents of the cement to an extremely high temperature; then feeding said constituents into a closed vessel and therein, by internally generated heat, causing them to combine to form a fusible slag; and then converting said slag into a pulverulent cementitious material.

3. A cement-making process of the nature disclosed, consisting in separately bringing lime and shale to an incandescent temperature; then feeding said intensely pre-heated substances into a fused bath of slag formed by the chemical combination of said substances, whereby their continuous combination may be promoted; and withdrawing portions of said bath and converting the same into pulverulent cementitious material.

4. A process of making hydraulic cement by separately heating lime and aluminum silicate to about between 1600° C. and 1700° C. then feeding said pre-heated materials into a bath of slag maintained at a high temperature by internally developed heat, whereby said materials may chemically combine to form further additions to the bath slag; and withdrawing portions of said bath and converting the same into a cementitious powder.

5. A process of making hydraulic cement by causing impure lime and aluminum silicate chemically to combine at a temperature sufficiently high to form a fusible slag; adding a reducing agent to yield metallic magnesium from this compound and enable said magnesium to be volatilized; and subsequently converting the slag into a cementitious powder.

6. A process of making hydraulic cement by causing lime and aluminum silicate containing iron to combine to form a fused slag under conditions enabling the iron to form ferro-silicon; withdrawing portions of the slag free from iron and converting it into a pulverulent cementitious material; and withdrawing the ferro-silicon separately.

7. A process for obtaining magnesium and cement by subjecting lime and shale, containing magnesium, to an intense heat under reducing conditions yielding volatilized magnesium and a fused bath of the cementitious compound; collecting and condensing the volatilized magnesium; and withdrawing portions of said bath converting the same into a pulverulent form.

8. A process of obtaining magnesium and ferro-silicon by subjecting a material containing iron, silicon and magnesium to an intense heat under conditions adapted to reduce and volatilize the magnesium and to form fused ferro-silicon; collecting and condensing the volatilized magnesium; and withdrawing and permitting to cool the fused ferro-silicon.

9. A process of the nature disclosed which comprehends separately raising an acid mineral and a basic mineral to an incandescent temperature by means of heat derived from the combustion of fuel; and then bringing together in a closed container said incandescent minerals and developing within said container heat from electrical energy to further elevate the temperature and cause said minerals to react to form a slag.

10. A process of the nature disclosed which comprehends separately raising an acid mineral and a basic mineral to an incandescent temperature by means of heat derived from the combustion of fuel; then bringing together in a closed container said incandescent minerals and developing heat within said container to further elevate the temperature and cause said minerals to react to form a slag; and then physically dispersing said molten slag into a state of minute sub-division before permitting it to cool and harden.

11. A process of the nature disclosed which comprehends separately raising an acid mineral and a basic mineral to an incandescent temperature; then bringing together in a closed container said incandescent minerals and supplying heat within said container to further elevate the temperature and cause said minerals to react to form a slag; then physically dispersing said molten slag into a state of minute sub-division before permitting it to cool and harden; and then grinding said sub-divided slag into a pulverulent form.

12. A process of the nature disclosed which comprehends introducing a large amount of an acid and a basic mineral associated with a small amount of a compound of a volatile metal into an electric furnace; then raising the temperature in the presence of a reducing agent to a point adequate to reduce and volatilize said metal and to produce a slag from said minerals; and then separately collecting the volatilized metal and the molten slag.

13. A process of the nature disclosed which comprehends introducing a large amount of an acid and a basic mineral associated with a small amount of a compound of a volatile metal into an electric furnace; then raising the temperature in the presence of a reducing agent to a point adequate to reduce and volatilize said metal and to produce a slag from said minerals; then separately collecting the volatilized metal and the molten slag: and physically affecting a minute sub-division of said sag while molten.

14. A process of the nature disclosed which comprehends introducing an acid and a basic mineral associated with iron and silicon into an electric furnace; raising the temperature therein to cause the iron to form a bath of ferro-silicon and the said materials to form an overlying bath of slag; and then recovering said ferro-silicon and bringing said slag, while molten, into a state of minute sub-division.

15. A process of the nature disclosed which comprehends bringing together within an electric furnace lime and aluminum silicate in the presence of an iron-bearing compound; then raising the temperature to form a bath of ferro-silicon and an overlying bath of slag; and then recovering said ferro-silicon and minutely sub-dividing said slag, while molten, by means of an air blast.

16. A process of the nature disclosed which comprehends separately heating an acid and a basic mineral to incandescence by heat derived from the combustion of fuel; then introducing said incandescent minerals into an electric furnace and therein further elevating the temperature to cause them to combine to form a slag; then blowing said slag into a wool; and then pulverizing said wool.

In witness whereof, I hereunto subscribe my name, as attested by the two subscribing witnesses.

WOOLSEY McA. JOHNSON.

Witnesses:
M. J. COOPER,
B. COOKE.